Nov. 3, 1959  K. M. MacDOWELL  2,911,486
PHASE INVERSIONS
Filed April 8, 1954
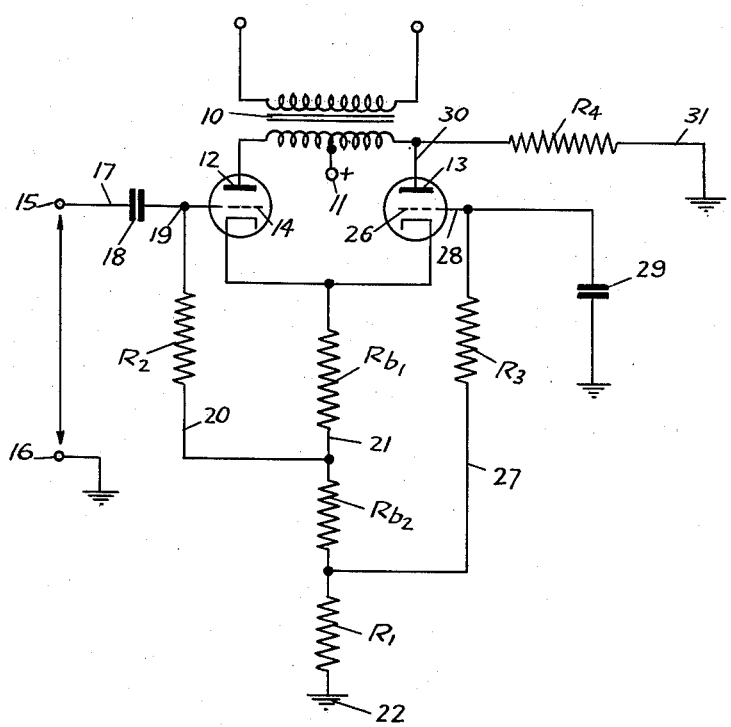
INVENTOR
KENNETH M. MACDOWELL
BY Elmer J. Gorn
ATTORNEY

United States Patent Office 2,911,486
Patented Nov. 3, 1959

2,911,486

PHASE INVERSIONS

Kenneth M. MacDowell, West Newton, Mass., assignor to Raytheon Manufacturing Company, Waltham, Mass., a corporation of Delaware Application April 8, 1954, Serial No. 421,745

4 Claims. (Cl. 179—171)

This invention relates to phase inverter circuitry, and particularly, to phase inverter circuits for converting a signal input voltage to an amplified push-pull output for delivery to an audio-frequency utilization circuit as, for example, an audio-frequency transformer.

The invention is characterized by the provision of voltage compensating means to offset the drive inequality inherent in cathode coupled dual triode amplifiers employed as phase inverters. As herein disclosed, the voltage compensating means is provided by establishing a resistance differential between the plate circuits of the two segments of the dual triode, which differential operates to decrease the magnitude of the A.C. current developed in the cathode circuit by virtue of the action of the second driving stage, thereby augmenting the net driving effect of this second stage sufficiently to bring it into balance with the driving effect of the first stage. In the illustrated embodiment, this drive balance is accomplished by increasing the bias in the second stage to increase the ratio $R_{p2}/R_{p1}$, wherein $R_{p2}$ represents the plate circuit resistance of the second stage, and $R_{p1}$ the plate circuit resistance of the first stage—that is, the triode whose grid receives the input signal voltage. In other words, an object of the invention is to achieve equal plate output signal voltages for each stage.

Other characteristics of the invention will be apparent as the description thereof progresses.

In the drawing, reference numeral 10 designates a transformer whose primary winding is center-tapped to a voltage source 11 and end-connected to plates 12 and 13 of a phase inverting dual triode amplifier, for push-pull operation of the transformer. The grid 14 of the first stage of the amplifier is excited by an input signal voltage applied across terminals 15 and 16, the latter being grounded and the former being connected to the grid by a lead 17 including a condenser 18 and a tap-off 19 for the shunting connection 20 to the cathode coupling circuit 21 leading to ground 22, and including resistors $R_{b1}$, $R_{b2}$, and $R_1$.

The grid 26 of the second stage of the amplifier is excited by way of phase inverting lead 27 interconnecting circuit 21 with the grid lead 28, the latter being grounded by way of condenser 29. The leads 20 and 27 contain resistors $R_2$ and $R_3$ of preferably equal value, and the grounded lead 31 in the plate circuit 30 contains a resistor $R_4$, for a purpose to be further explained.

Conventional cathode coupled phase inverters suffer the defect that the signal levels to the two halves of a dual triode are unequal. The unequal drives cause second harmonic distortion in the output since the positive and negative peaks of the sine wave have different values in the push-pull output. The right-hand tube has less drive than the left when two tubes of the same type are used, as the A.C. cathode to ground voltage can never equal the A.C. grid-to-cathode voltage of the left-hand tube. The reason is as follows: Since the A.C. cathode current developed by the right-hand tube is of opposite phase to the A.C. current developed by the left-hand tube, and if the $G_m$'s of each tube are equal, the grid-to-cathode voltages and thus, the plate currents of each tube, must be unequal in order to develop a cathode voltage to drive the right-hand tube. The larger the cathode-to-ground resistance, the more equal the tube drives and tube currents become, since it is the difference in currents that drives the right-hand tube.

The tube drives, in the ideal case, become equal when each tube receives exactly half the input signal drive. The following relationships obtain:

$$e_{in} = e_1 + e_2$$

$$e_2 = R_k(i_1 - i_2)$$

$$G_{m1} = \frac{i_1}{e_1}$$

$$G_{m2} = \frac{i_2}{e_2}$$

For the case of $G_{m1} = G_{m2} = G_m$:

$$e_2 = G_m R_k (e_1 - e_2)$$

$$e_2(1 + G_m R_k) = e_1 G_m R_k$$

$$\frac{e_2}{e_1} = \frac{G_m R_k}{1 + G_m R_k} \text{ or } \frac{e_2}{e_{in}} = \frac{G_m R_k}{1 + 2G_m R_k}$$

For the case of $e_1 = e_2$:

$$e_2 = e_2 R_k (G_{m1} - G_{m2})$$

$$G_{m1} - G_{m2} = \frac{1}{R_k}$$

The general tube equation simplified is $e_{p1} = \mu e_1 - i_1 R_{p1}$ which shows that for a typical triode the factor $\mu e_1$ is the predominant one in determining $e_{p1}$, when a large plate load is used in conjunction with a large cathode resistance. For example, when $\mu = 20$, $i_1 = .2$ milliampere, $e_1 = 1$ volt and $R_{p1} = 10{,}000$ ohms, then $e_{p1} = 20 - 2$.

In these equations, the symbols have the following significance:

$e_{in}$ = voltage applied to grid 14
$e_1$ = grid-to-cathode voltage (l. h. tube)
$e_2$ = Grid-to-cathode voltage (r. h. tube)
$R_k = R_{b1} + R_{b2} + R_1$
$i_1$ = plate circuit current (l. h. tube)
$i_2$ = plate circuit current (r. h. tube)
$\mu$ = amplification factor
$R_{p1}$ = plate resistance
$e_{p1}$ = signal plate voltage Therefore, if the amplification factor does not change appreciably with a change in bias, which is the present case, then, the increase in $e_{p1}$ (plate signal output) due to an increase in drive to the right-hand tube is much more important than the decrease in $e_{p1}$ due to the decrease in $G_m$ of said tube. This is actually what happens, therefore, when the $G_m$ of the right-hand tube is decreased. However, the $G_m$ of the right-hand tube cannot be decreased to the point where the two tube currents and, therefore, the plate voltages, are exactly equal because, if this condition obtained there would not be a difference in current with which to develop a signal drive for the right-hand tube. However, if the $G_m$ of the right-hand tube is decreased to the point where the tube drives become substantially equal, which point occurs when $$G_{m1} - G_{m2} = \frac{1}{R_K}$$

then the plate voltages are more nearly alike than possible if each tube had the same $G_m$. In this manner, harmonic distortion occurring due to unequal plate voltages is substantially reduced by making the value of the signal plate voltage to each tube more equal than heretofore.

To achieve this object, the $G_m$ of the right-hand tube, $G_{m2}$ is lowered by connecting its grid 26 through $R_3$ to a point on the total cathode resistance which is closer to ground than the tap 21 to which the grid 14 of the left-hand tube through $R_2$ is connected. Therefore, the right-hand tube receives a greater signal drive than if $R_3$ were connected to the corresponding tap for the first or left-hand tube. At the same time, the entire alternating current drive voltage developed across the total cathode resistance is used to drive the right-hand tube by grounding grid 26 through capacitor 29, while, the left-hand tube receives the difference between the input signal drive voltage and the signal drive to the right-hand tube.

To counteract the effect such bias unbalance might have on the relative currents in the two sections of the transformer primary, a large resistor $R_4$ is placed in the grounded shunt portion 31 of the plate circuit 30. This will tend to maintain equal current division between the two primary sections of the transformer, and will also serve to prevent any possible saturation of the audio transformer core.

In actual operation, the following choice of values has proven to be effective in producing signal-to-distortion ratios of more than 50 db:

| | |
|---|---|
| $R_1$ | 4.7K |
| $R_2$ | 470K |
| $R_3$ | 470K |
| $R_4$ | 82K |
| $R_{b1}$ ohms | 820 |
| $R_{b2}$ do | 220 |
| Condensers 18 and 29 μfd | .05 |

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a phase inverting circuit for controlling push-pull operation of an audio frequency transformer, the combination with said transformer of a pair of amplifiers each having at least a cathode, an anode and a control electrode, having their respective anodes connected to the ends of the primary winding of said transformer and their cathodes connected together, an electrical energy source having a positive terminal connected to the midpoint of said primary winding, means for applying a signal voltage to the control electrode of the first amplifier, cathode resistor means for applying to said second amplifier at least a portion of the voltage output of said first amplifier displaced by substantially 180 degrees from said input signal voltage applied at the control electrode of said first amplifier, said means including three cathode resistors connected in series between said cathodes and ground, a first resistance connected between the control electrode of said first amplifier and the junction of two of said cathode resistors nearest to said cathode connection, a second resistance of substantially the same value as said first resistance connected between the control electrode of said second amplifier and the common junction of two of said cathode resistors nearest to ground, said cathode resistors having such resistance values as to proportion the input signal voltages of the two amplifiers and the gains of the two amplifiers so as to provide equal signal voltage outputs at the anodes of said amplifiers, and resistance loading means connected between the anode of said second amplifier and ground, whereby the transformer saturating effect due to unequal anode currents is substantially eliminated.

2. In a phase inverting circuit for controlling push-pull operation of an audio frequency transformer, the combination with said transformer of a pair of amplifiers each having at least a cathode, an anode and a control electrode, having their respective anodes connected to the ends of the primary winding of said transformer and their cathodes connected together, an electrical energy source having a positive terminal connected to the midpoint of said primary winding, means for applying a signal voltage to the control electrode of the first amplifier, cathode resistor means for applying to said second amplifier at least a portion of the voltage output of said first amplifier displaced by substantially 180 degrees from said input signal voltage applied at the control electrode of said first amplifier, said means including three cathode resistors connected in series between said cathodes and the negative terminal of the said electrical energy source, an energy storing device connected between the control electrode of said second amplifier and ground, a first resistance connected between the control electrode of said first amplifier and the junction of two of said cathode resistors nearest to said cathode connection, a second resistance of substantially the same value as said first resistance connected between the control electrode of said second amplifier and the junction of two of said cathode resistors nearest to ground, said cathode resistors having such resistance values as to proportion the input signal voltages of the two amplifiers and the gains of the two amplifiers so as to provide equal signal voltage outputs at the anodes of said amplifiers, and resistance loading means connected between the anode of said second amplifier and ground, whereby the transformer saturating effect due to unequal anode currents is substantially eliminated.

3. An amplifying circuit for controlling push-pull operation of an audio transformer, the combination with said transformer of a grid-driven first amplifier and a cathode-driven second amplifier, each of said amplifiers having an input circuit for tubes having a cathode, a grid and an anode, the anodes of said tubes connected to the ends of the primary winding of said transformer to provide a push-pull output circuit, means to apply an operating potential to the midpoint of said primary winding, means to apply a signal voltage to the input circuit of said first amplifier, means connecting a portion of the output signal voltage of said first amplifier to the input circuit of said second amplifier in out-of-phase relationship to the input signal voltage of said first amplifier, said latter means including a tapped bias resistor in the common cathode circuit for both of said amplifiers, an input resistor for said grid-driven amplifier connected between the grid of said grid-driven amplifier and a first tap on said tapped biased resistor, an input resistor for said cathode-driven amplifier connected between the grid on said cathode-driven amplifier and a second tap on said bias resistor more remote from the cathode of each amplifier tube than the first tap, the first and second taps being so located as to proportion the signal inputs between the two amplifiers and the gains of the two amplifiers so as to give equal alternating current outputs at the anodes of said amplifiers, and resistance loading means connected across the output of said second amplifier to balance the direct current flow in said push-pull output circuit.

4. A phase inverting circuit for controlling push-pull operation of an audio transformer, the combination with said transformer of a grid-driven amplifier and a cathode-driven amplifier each having at least a cathode, a grid and an anode, an electrical energy source, said amplifiers having said anodes connected to the ends of the primary winding of said transformer and cathodes linked by a common cathode biasing resistance to ground, a positive terminal of said electrical energy source connected to the midpoint of said primary winding, means for feeding a signal voltage to the grid of said grid-driven amplifier, a first bias resistor linking the grid of said grid-driven amplifier to a tap on said common cathode biasing resistance, a second bias resistor linking the grid of said cathode-driven amplifier to a second tap located on said cathode biasing resistance between said first tap and ground, the first and second taps being so located as to proportion the signal inputs between the two amplifiers and the gains of the two amplifiers so as to give equal alternating current outputs at the anodes of said amplifiers, and a resistor connected from the anode of said cathode-driven amplifier to ground, whereby unequal current division in said push-pull output circuit is substantially eliminated.

References Cited in the file of this patent

UNITED STATES PATENTS

| | | |
|---|---|---|
| 1,636,146 | Mohr | July 19, 1927 |
| 1,924,469 | Strecker | Aug. 29, 1933 |
| 1,985,352 | Numans | Dec. 25, 1934 |
| 2,361,282 | Gilbert | Oct. 24, 1944 |
| 2,383,846 | Crawley | Aug. 28, 1945 |
| 2,561,047 | Broos | July 17, 1951 |
| 2,594,436 | Hornfeck et al. | Apr. 29, 1952 |
| 2,637,786 | Bordewieck | May 5, 1953 |

FOREIGN PATENTS

| | | |
|---|---|---|
| 652,126 | Great Britain | Apr. 18, 1951 |